United States Patent [19]  
Krebs

[11] 4,068,383
[45] Jan. 17, 1978

[54] TAPE MEASURE REEL
[75] Inventor: Klaus Krebs, Neuenhain, Germany
[73] Assignee: hoechstmass Balzer GmbH & Co., Frankfurt am Main, Germany
[21] Appl. No.: 728,131
[22] Filed: Sept. 30, 1976
[30] Foreign Application Priority Data
  Oct. 9, 1975  Germany ............................ 2545203
[51] Int. Cl.² ............................................ G01B 3/10
[52] U.S. Cl. .................................. 33/138; 242/107.6
[58] Field of Search ............... 242/84.8, 107.3, 107.6; 33/138, 139, 140

[56] References Cited
U.S. PATENT DOCUMENTS

| Re. 4,419 | 6/1971 | Bradley | 242/107.6 |
| 467,280 | 1/1892 | Lane | 242/107.3 |
| 959,750 | 5/1910 | Joseph | 242/107.3 |
| 2,172,043 | 9/1939 | Wolf | 33/138 |

FOREIGN PATENT DOCUMENTS 1,336,553  4/1971  United Kingdom ................. 33/138

*Primary Examiner*—Harry N. Harioan
*Attorney, Agent, or Firm*—Curtis, Morris & Safford

[57] ABSTRACT

A tape measure is disclosed having a hollow casing formed of first and second superimposed casing sections, each including a resilient tongue formed therein. The tongue on the first casing section includes an axial rod extending transversely of the casing to an end located adjacent the tongue on the second casing section. A tape drum is rotatably mounted within the casing and has an opening therein through which the rod extends to permit relative rotation between the drum and the rod. An elongated flexible tape is secured to the drum and is normally wound thereon; and a coil spring is provided within the drum normally biasing the drum in a rotary direction for winding the tape on the drum. The drum and the tongue on the second casing section include cooperating abutments or cam surfaces for normally holding the drum against rotation under the bias of the spring, such that upon depression of the tongue on the first casing section towards the second casing section the rod in the casing moves the tongue on the second casing section away from the drum to disengage the abutments so that the drum is free to rotate under the influence of the spring to wind tape thereon.

9 Claims, 9 Drawing Figures

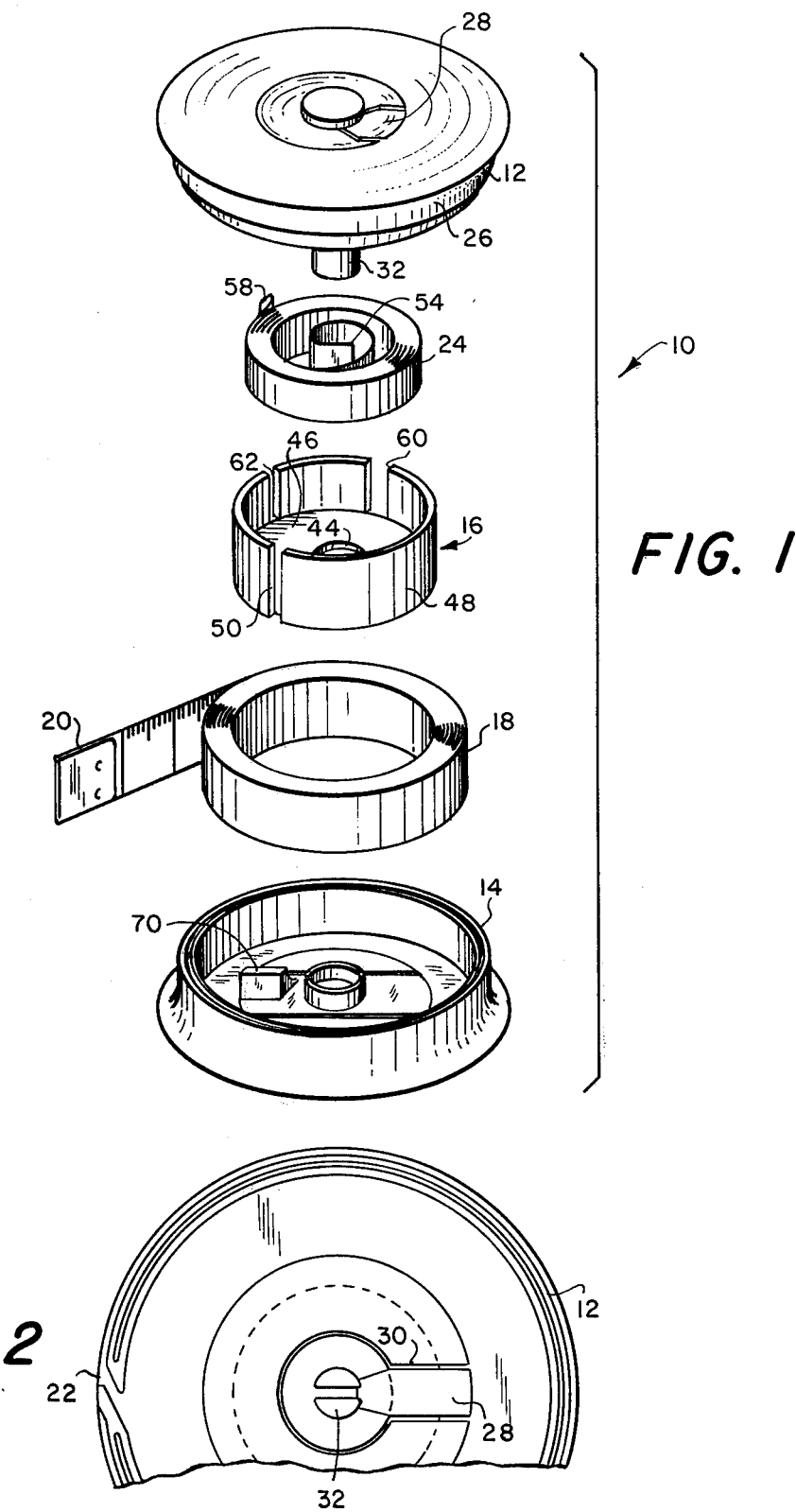

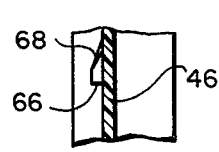
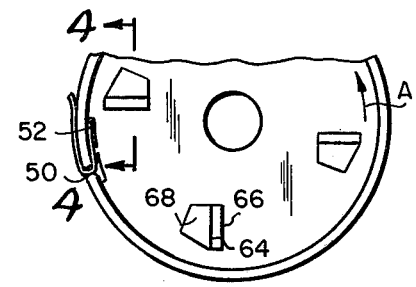
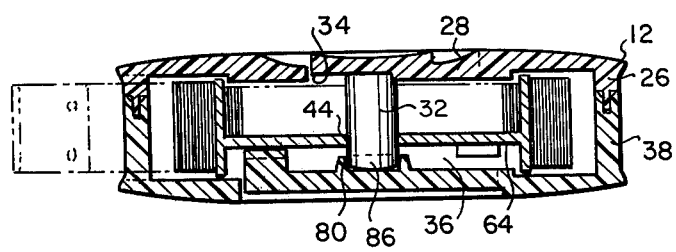
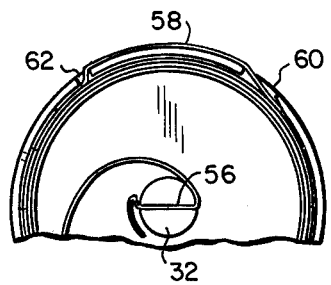
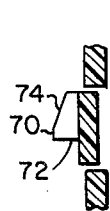
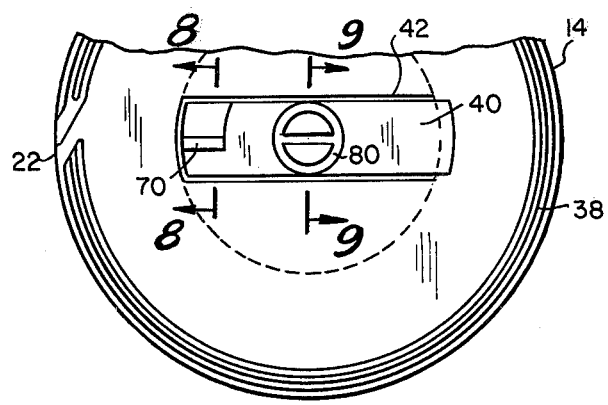
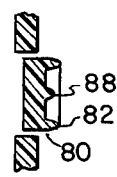

TAPE MEASURE REEL

The present invention relates to roll type tape measures, and in particular to tape measures of the type which have an automatic spring return and rewind for the tape in the casing.

The typical well known roll type tape measures have hollow axles mounted within the casing for the tape, into which a thrust bolt is received. The thrust bolt cooperates with a so-called "arrester" secured thereto and a pressure spring, such that the arrester or stop is pressed by the spring into engagement with notches on the spring drum which provides the rotary drive for winding the tape, so that rotation of the drum can be prevented at any desired point. By applying pressure to the centrally located thrust bolt, the stopping action of the arrester is released, so that the measuring tape can be automatically withdrawn into the casing under the influence of the spring.

While completely assembled tape measure casings of this type have a relatively simple exterior appearance, they typically consist of ten individual parts whose assembly requires a great deal of skill and a substantial amount of manufacturing time. One such tape measure is shown in German Auslegeschrift No. 1,448,399 and consists of 26 separate pieces which must be assembled.

Accordingly, it is an object of the present invention to provide a novel stop arrangement for a tape measure which requires a relatively small number of parts, and which avoids the drawbacks of previously proposed tape measures.

Another object of the present invention is to provide a relatively simply constructed tape measure casing.

A still further object of the present invention is to provide a tape measure which is relatively simple to manufacture and is durable in construction.

According to an aspect of the present invention a hollow tape measure casing is provided which includes first and second generally circular side walls and an annular peripheral wall defining a hollow chamber within the casing. The peripheral side wall of the casing has an opening therein which permits extension and retraction of tape in the casing. The two circular side walls each have resilient tongues formed therein with the tongue in the first side wall including an integral rod extending transversely of the chamber in the casing from the first side wall to the second side wall and also having a free end located adjacent the tongue in the second side wall. A tape drum is located in the casing and has an opening therein which receives the rod so that the drum can rotate in the chamber with respect to the rod.

An elongated flexible measuring tape having one end secured to the drum and a second end extending through the slot in the casing is normally wound on the drum. Spring means in the casing operatively connects the rod and the drum for normally biasing the drum in a predetermined direction of rotation for winding the tape on the drum.

In order to arrest or stop rotation of the drum under the influence of the spring, the drum has at least one stop cam formed thereon including a ramp surface and a perpendicularly extending stop surface facing in the direction of rotation of the drum during tape winding. The tongue on the second casing section or side wall has a cooperating tooth extending towards the drum in the path of rotation of the cam to normally prevent rotation of the drum in the winding direction while permitting rotation of the drum in an opposite or unwinding direction. As a result, depression of the tongue on the first side wall moves the rod against the tongue on the second side wall to disengage the cooperating tooth and stop surfaces to permit automatic rewinding of the tape under the influence of the spring.

The above, and other objects, features and advantages of this invention will be apparent in the following detailed description of an illustrative embodiment thereof, which is to be read in connection with the accompanying drawings, wherein:

FIG. 1 is an exploded perspective view of a tape measure constructed in accordance with the present invention;

FIG. 2 is a partial view of one side of one of the casing elements shown in FIG. 1;

FIG. 3 is a partial bottom view of the tape winding drum shown in FIG. 1;

FIG. 4 is a sectional view taken along line 4—4 of FIG. 3;

FIG. 5 is a sectional view of the assembled tape measure of the present invention;

FIG. 6 is a partial plan view of the opposite side of the tape winding drum shown in FIG. 3;

FIG. 7 is a partial plan view of one side of the other casing section of the tape measure of the present invention;

FIG. 8 is a sectional view taken along line 8—8 of FIG. 7; and

FIG. 9 is a sectional view taken along line 9—9 of FIG. 7.

Referring now to the drawing in detail, and initially to FIG. 1 thereof, it will be seen that a tape measure 10, constructed in accordance with the present invention includes a pair of dish-shaped casing sections or housing portions 12, 14 which receive therebetween a tape winding drum 16. The drum has a flexible tape measure 18 of cloth, metal or the like, wound thereon with one end portion 20 extending outwardly through a slot 22 formed in the side walls of the casing elements 12, 14. Drum 16 is operatively engaged with a spring 24 that biases the drum for rotation in a direction for winding tape 18 onto the periphery of the drum.

Casing section 12 has a generally circular configuration and includes a peripheral perpendicularly extending side wall 26 having a portion of the slot 22 formed therein. In addition the casing has an integral tongue 28 formed therein defined by a slot 30. The casing section 12, as well as the casing section 14 described hereinafter, are formed of a molded plastic construction, and thus the tongue 28 is readily molded therein. The tongue acts as a flexible leaf spring and normally rests in the position illustrated in FIG. 5. This tongue includes a central rod or stud 32 which extends downwardly from the inner surface 34 of the tongue transversely of the chamber 36 defined by side casing sections 12, 14 towards casing section 14.

Casing section 14 has a similar circular configuration and also includes a peripheral side wall 38 having a portion of slot 22 formed therein. As seen in FIG. 5, the peripheral edges of side walls 26, 38 have a tongue and groove relationship which permits the two casing sections to be mated to each other. The casing sections in the completed device can be seated to each other by heat sealing or an adhesive, as desired.

Casing section 14 includes a flexible tongue 40 molded therein, in a manner similar to tongue 28 of casing section 12. The tongue is defined by a three-sided slot 42 which surrounds three sides of the tongue, as seen in FIG. 7. As casing section 14 is also formed of a molded plastic material, tongue 14 is also a flexible leaf-spring type member, and it normally maintains the position illustrated in FIG. 5.

Tape winding drum 16 has an external diameter which is smaller than the diameter of chamber 36 and includes a central opening 44 which receives rod 32 to permit the drum to rotate about the centrol axis of the casing as defined by rod 32. The drum includes a circular web portion 46 and an annular peripheral side wall 48. This side wall has an opening or notch 50 formed therein which receives the inner end 52 of tape 18. The tape is wound about the peripheral wall 48 of the drum in the conventional manner and, as mentioned above, its free end 20, which has a pull tab mounted thereon in any convenient manner, extends through slot 22 in the peripheral side wall of the casings.

Drum 16 is biased in rotation for winding the tape on the drum by spring 24. That spring has an inner end portion 54 which is engaged in a slot 56 formed in rod 32. The spring is a conventional flat metal coil spring, and it includes an outer end portion 58 which is locked into a pair of slots 60, 62 formed in the peripheral wall 48 of drum 16, in any convenient manner, as illustrated in FIG. 6. The spring of course has a natural tendency to unwind, and this tendency urges drum 16 in a direction of rotation for winding the tape on the drum.

The disc portion 46 of drum 16 includes a plurality of cam members 64 formed therein. Each of these cam members includes a stop surface 66 which extends perpendicularly from disc 46 and faces in the direction of rotation of the disc under the influence of spring 24, as indicated by the arrow A in FIG. 3. In addition, the cams each include a ramp surface 68 which inclines from the surface of disc 46 to the most outwardly extending portion of stop surface 66. These cam surfaces are located in radially positioned circumferentially spaced locations with respect to each other for cooperation with a tooth 70 formed on lever 40 of casing section 14. This tooth is located to be in the path of travel of cams 64 during rotation of drum 16.

In the normal relaxed position of lever 40, illustrated in FIG. 5, tooth 70, which also has a stop surface 72 and a ramp surface 74 (see FIG. 8), has its stop surface 72 engaged with the stop surface 66 of one of the cams 64, thereby preventing the rotation of disc 16 in a winding direction. However, when tape is withdrawn from the casing, by manually pulling end 20 thereof, drum 16 is rotated in a direction opposite to the direction indicated by the arrow A in FIG. 3 and ramp surfaces 74, 68 cooperate with each other to permit the disc to rotate in this direction. Such rotation also tends to wind spring 24 within drum 16. When the force applied to the tape withdrawing the tape from the casing is removed, i.e. when the tape is let go, spring 24 would normally tend to retract the tape. However, rotation of the drum in the winding direction is prevented by the engagement of the abutment surfaces 72, 66.

When it is desired to retract the tape into the casing, lever 28 is depressed, thereby urging rod 32 transversely of the casing against lever 40, and thus moving that lever downwardly, from the position shown in FIG. 5. This downward movement of the lever disengages abutment surfaces 72, 66 and permits drum 16 to rotate in the winding direction. When tape 18 has been rewound to the desired extent the pressure applied to lever 28 is relieved and lever 40 returns to its original position preventing further rotation of drum 16. When the tape is retracted to its full extent the pull tab on the end 20 of the tape prevents the end of the tape from entering into slot 22, where it would be otherwise inaccessible.

In order to keep rod 32 properly aligned with lever 40 a pocket 80 is formed on the lever, as seen in FIGS. 7 and 9. This pocket includes an annular wall 82 which defines a recess in pocket 80 that receives the lower end 86 of rod 32. The pocket also includes a transverse wall member 88 which is received in the generally complementary slot 56 at the end of the rod. This arrangement will also serve to prevent relative rotation between the two casing elements.

Accordingly, it is seen that a relatively simply constructed tape reel having essentially only five parts, namely the two casing sides 12, 14, the rotatable drum 16, the spring and the tape itself, is provided which will be relatively simple to manufacture and assemble. The tape measure is durable in construction, and provides a positive stopping action for the tape, when lever 28 is released.

Although an illustrative embodiment of the present invention has been described herein with reference to the accompanying drawings, it is to be understood that the invention is not limited to the precise embodiment thereof, but various changes and modifications may be effected therein by one skilled in the art without departing from the scope or spirit of this invention.

What is claimed is:

1. A tape measure comprising a hollow casing having first and second superimposed casing sections, said casing sections each including a resilient tongue, said tongue on said first casing section including an axial rod extending transversely of the casing to an end adjacent the tongue on the second casing section, a tape drum rotatably mounted within said casing and having an opening therein through which said rod extends, an elongated flexible tape secured to said drum and being normally wound thereon, and means in said casing operatively engaged with said drum for normally biasing said drum in a rotary direction for winding the tape on the drum, said drum and said tongue on the second casing section including cooperating means for normally holding said drum against rotation and under the bias of said spring means whereby depression of the tongue on the first casing section towards the second casing section causes said rod to move the tongue on the second casing section away from the drum to disengage said cooperating means whereby the drum is free to rotate under the influence of the spring means to wind the tape thereon; said cooperating means comprising at least one stop on said drum extending therefrom towards said second casing section and a cooperating tooth on said tongue of the second casing section extending towards said drum and normally located in the path of travel of said stop during rotation of the drum.

2. A tape measure as defined in claim 1 wherein said first and second casing sections are formed of molded plastic and said rod is integrally formed with the tongue of the first casing section.

3. A tape measure as defined in claim 1 wherein said spring means comprises a flat metal coil spring operatively connected between said rod and said drum, said rod being located centrally in said drum and defining the axis of rotation of the drum.

4. A tape measure as defined in claim 3 wherein said end of said rod adjacent the tongue of the second casing element has a slot formed therein and said tongue of said second casing element has an upstanding complementary boss formed thereon received in said slot on the rod.

5. A tape measure comprising first and second generally circular side walls and an annular peripheral side wall therebetween defining a hollow chamber between said walls, said peripheral side wall having an opening therein to permit tape extension and retraction from the tape measure, said side walls each having a resilient tongue formed therein, the tongue in said first side wall including an integral rod extending transversely of said chamber from said first side wall to said second side wall and having a free end located adjacent the tongue in said second side wall, said rod being centrally located in said chamber, a tape drum located in said chamber and having an opening therein receiving said rod whereby said drum is adapted to rotate in said chamber with respect to said rod, an elongated flexible measuring tape having one end secured to said drum and a second end extending through said slot, said tape being normally wound on said drum, spring means in said casing operatively engaged between said rod and said drum for normally biasing said drum in a predetermined direction of rotation for winding the tape on said drum, said drum having at least one cam formed thereon including a ramp surface and a perpendicularly extending stop surface facing in said predetermined direction of rotation, and said tongue on said second side wall having a cooperating tooth extending towards said drum in the path of rotation of the cam to normally prevent rotation of the drum in said predetermined winding direction and permit rotation of the drum in an opposite unwinding direction whereby depression of the tongue on the first side wall moves said rod against the tongue on the second side wall to disengage said tooth and stop surface to permit automatic rewinding of the tape under the influence of said spring means.

6. A tape measure as defined in claim 5 wherein said side walls are formed of molded plastic and include integrally formed peripheral wall portions extending perpendicularly therefrom, said peripheral wall portions being operatively connected to each other and defining said annular peripheral wall.

7. A tape measure as defined in claim 6 wherein said rod has a slot formed therein and said spring means comprises a flat metal coil spring having one end secured in said slot and a second end secured to said drum.

8. A tape measure as defined in claim 7 wherein said tongue on said second side wall has an upstanding complementary boss formed thereon received in said slot in the end of the rod adjacent said second tongue.

9. A tape measure as defined in claim 8 wherein said drum includes a plurality of radially positioned angularly spaced cams formed thereon.

* * * * *